(12) United States Patent
Hamada

(10) Patent No.: US 11,121,868 B2
(45) Date of Patent: Sep. 14, 2021

(54) SECURE COMPUTATION SYSTEM, SECURE COMPUTATION DEVICE, SECURE COMPUTATION METHOD, AND PROGRAM

(71) Applicant: NIPPON TELEGRAPH AND TELEPHONE CORPORATION, Chiyoda-ku (JP)

(72) Inventor: Koki Hamada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 317 days.

(21) Appl. No.: 16/309,034

(22) PCT Filed: Jun. 30, 2017

(86) PCT No.: PCT/JP2017/024140
§ 371 (c)(1),
(2) Date: Dec. 11, 2018

(87) PCT Pub. No.: WO2018/008545
PCT Pub. Date: Jan. 11, 2018

(65) Prior Publication Data
US 2019/0229904 A1 Jul. 25, 2019

(30) Foreign Application Priority Data
Jul. 6, 2016 (JP) .............................. JP2016-134089

(51) Int. Cl.
*H04L 9/08* (2006.01)
*G09C 1/00* (2006.01)
(Continued)

(52) U.S. Cl.
CPC ............ *H04L 9/0861* (2013.01); *G06F 17/18* (2013.01); *G06F 21/602* (2013.01); *G09C 1/00* (2013.01);
(Continued)

(58) Field of Classification Search
CPC ....... H04L 9/0861; H04L 9/0869; H04L 9/08; H04L 63/0428; H04L 63/0421; G06F 17/18; G09C 1/00
See application file for complete search history.

(56) References Cited

U.S. PATENT DOCUMENTS 9,064,123 B2 * 6/2015 Ikarashi ................ G06F 21/602
9,946,810 B1 * 4/2018 Trepetin .................. H04L 9/008
(Continued)

OTHER PUBLICATIONS

Padam Signh, 2x2 Contingency Table: Fisher's Exact Test, Apr. 2014, Journal of Clinical and Preventive Cardiology, pp. 66-70 (Year: 2014).*
(Continued)

*Primary Examiner* — Kristine L Kincaid
*Assistant Examiner* — Shaqueal D Wade
(74) *Attorney, Agent, or Firm* — Oblon, McClelland, Maier & Neustadt, L.L.P.

(57) ABSTRACT

Fisher's exact test is efficiently computed through secure computation. A computation range determination part determines $i_0$, $i_1$, $x_0$, $x_1$. A preliminary computation part computes $f(x_0), \ldots, f(x_1)$, and generates an array $M=(f(x_0), \ldots, f(x_1))$. A securing part secures the array M, and generates a secure text array $<M>=(<f(x_0)>, \ldots, <f(x_1)>)$. A batch-reading part generates a function value secure text $(<f(a_i)>, <f(b_i)>, <f(c_i)>, <f(d_i)>)$ $(i_0 \le i \le i_1)$.

8 Claims, 2 Drawing Sheets

(51) Int. Cl.
  *G06F 17/18*  (2006.01)
  *G06F 21/60*  (2013.01)
  *G06F 21/71*  (2013.01)
  *H04L 29/06*  (2006.01)
  *G06F 21/72*  (2013.01)

(52) U.S. Cl.
  CPC ............ *H04L 9/0869* (2013.01); *G06F 21/71* (2013.01); *G06F 21/72* (2013.01); *H04L 63/0421* (2013.01); *H04L 63/0428* (2013.01)

(56) References Cited

U.S. PATENT DOCUMENTS

| | | | | |
|---|---|---|---|---|
| 2009/0182797 A1* | 7/2009 | Dwork | ................ | G06F 16/2465 708/403 |
| 2015/0154406 A1* | 6/2015 | Naehrig | ................ | G06F 21/602 713/165 |
| 2018/0157703 A1* | 6/2018 | Wang | ................ | G06F 16/2453 |

OTHER PUBLICATIONS

Alexander, Schulz, Discriminative Dimensionality Reduction for Regression Problems using the Fisher Metric, 2015,IEEE, pp. 1-8 (Year: 2015).*

International Search Report dated Sep. 26, 2017 in PCT/JP2017/024140 filed Jun. 30, 2017.

Koki Hamada, et al., "Privacy Preserving Fisher's Exact Test (2)—for Large Samples," IPSJ SIG Technical Report, vol. 2016-CSEC-74. No. 38, Jul. 2016, pp. 1-6 (with English language translation of Outline).

Konrad Karczewski, "How to do a GWAS," Lecture note in GENE 210: Genomics and Personalized Medicine, 2015, 5 Pages.

Koji Chida, et al.. "A Three-Party Secure Function Evaluation with Lightweight Verifiability Revisited," CSS 2010, 2010, 6 Pages.

Yihua Zhang, et al., "Secure Distributed Genome Analysis for GWAS and Sequence Comparison Computation," BMC Medical Informatics and Decision Making, 2015, pp. 1-12.

Koki Hamada. et al., "A Round-Efficient Pattern Matching Algorithm for Secure Multi-party Computation," Computer Security Symposium 2014, Oct. 2014, pp. 674-681.

Extended European Search Report dated Dec. 12, 2019 in European Patent Application No. 17824150.1 citing documents AX-AZ therein, 7 pages.

Lopez , F. L. et al. "Fast and Memory-Efficient Significant Pattern Mining via Permutation Testing", arxiv.org, Cornell University Library, 201 Olin Library Cornell University Ithaca, XP080677993, Feb. 15, 2015, 12 pages.

Laud, P, "A Private Lookup Protocol with Low Online Complexity for Secure Multiparty Computation", [Lecture Notes in Computer Science, Lect.Notes Computer], Springer International Publishing, XP047518095, Aug. 2, 2015, pp. 143-157.

Launchbury, J. et al. "Efficient Lookup-Table Protocol in Secure Multiparty Computation", Proceedings of the 17th ACM SIGPLAN International Conference on Functional Programming, ICFP '12, XP055648902, Jan. 1, 2012, pp. 189-200.

* cited by examiner

SECURE COMPUTATION SYSTEM, SECURE COMPUTATION DEVICE, SECURE COMPUTATION METHOD, AND PROGRAM

TECHNICAL FIELD

The present invention relates to applied cryptographic technology and, in particular, to technology of computing Fisher's exact test without disclosing input data.

BACKGROUND ART

Fisher's exact test has been widely known as one of statistical test methods that perform a hypothesis test on the presence or absence of an association between explanatory variables and response variables provided as a 2×2 contingency table. Non-patent literature 1 describes the genome-wide association study (GWAS) as a usage example of Fisher's exact test.

Fisher's exact test is described. The following table is an example of a 2×2 contingency table where n subjects are classified and counted according to the presence or absence of mutation and the presence or absence of the onset of a predetermined disease.

|  | With mutation | Without mutation | Subtotal due to disease |
|---|---|---|---|
| With disease | a | b | $n_1._$ |
| Without disease | c | d | $n_2._$ |
| Subtotal due to mutation | $n._1$ | $n._2$ | n |

In the table, a, b, c and d represent frequencies. $n_1._$, $n_2._$, $n._1$ and $n._2$ represent subtotals. $n_1._=a+b$, $n_2._=c+d$, $n._1=a+c$, $n._2=b+d$. All of a, b, c, d, $n_1._$, $n_2._$, $n._1$ and $n._2$ are non-negative integers.

Here, for a non-negative integer i, the probability $p_i$ defined by an equation (1) is computed. According to the magnitude relationship between the sum of probabilities p represented by an equation (2) and a predetermined value α, which is called a significance level, the presence or absence of association between explanatory variables (the presence or absence of mutation in the above table) and response variables (the presence or absence of the disease in the above table) is tested. Here, $p_a$ is a probability value computed by the equation (1) about the contingency table where actual aggregation values a, b, c and d are adopted as frequencies.

$$p_i = \frac{(a+b)!(c+d)!(a+c)!(b+d)!}{(a+i)!(b-i)!(c-i)!(d+i)!(a+b+c+d)!} \quad (1)$$

$$p = \sum_{i \text{ s.t. } p_i \leq p_a \wedge a+i \geq 0 \wedge b-i \geq 0 \wedge c-i \geq 0 \wedge d+i \geq 0} p_i \quad (2)$$

Methods of obtaining specific operation results without decrypting encrypted numerical values include a method called secure computation (see Non-patent literature 2, for example). The method of Non-patent literature 2 performs encryption that allows three secure computation devices to hold the divided fragments of the numerical value, and the three secure computation devices perform cooperative computation, which can allow the three secure computation devices to hold the results of addition and subtraction, constant addition, multiplication, constant multiplication, logical operation (negation, logical multiplication, logical addition, and exclusive OR), and data notation conversion (integer, and binary numeral) without decrypting the numerical value, in a state of being distributed among the three secure computation devices, i.e., being left encrypted.

There is a conventional research that performs genome-wide association study while keeping genome information secret using cryptographic technology, in consideration of the sensitivity and secrecy of the genome information (see Non-patent literature 3, for example). Non-patent literature 3 proposes a method of performing a chi-square test while keeping genome information secret.

PRIOR ART LITERATURE

Non-Patent Literature

Non-patent literature 1: Konrad Karczewski, "How to do a GWAS" Lecture note in GENE 210: Genomics and Personalized Medicine, 2015.

Non-patent literature 2: Koji Chida, Koki Hamada, Dai Ikarashi, and Katsumi Takahashi, "A Three-Party Secure Function Evaluation with Lightweight Verifiability Revisited", CSS 2010, 2010.

Non-patent literature 3: Yihua Zhang, Marina Blanton, and Ghada Almashaqbeh, "Secure distributed genome analysis for gwas and sequence comparison computation", BMC medical informatics and decision making, Vol. 15, No. Suppl 5, p. S4, 2015.

SUMMARY OF THE INVENTION

Problems to be Solved by the Invention

In computation of each probability $p_i$ by Fisher's exact test, the same computations, such as x! and log(x!), appear many times. Provided that the computation is of a function f(x), the computation results ..., f(−1), f(0), f(1), f(2), ... of the functions f(x) are preliminarily computed and the values of computation results are referred to as required, thereby allowing the efficiency to be improved. However, according to the conventional art, it is assumed that $a_i=a+i$, $b_i=b-i$, $c_i=c-i$, and $d_i=d+i$, and it is also assumed that in computation of f(a+b), f(c+d), f(a+c), f(b+d), f(a+b+c+d), f($a_i$), f($b_i$), f($c_i$), and f($d_i$), let m be the number of types of values of computation results, let n be the number of types of probabilities $p_i$ to be computed (i.e., i=0, ..., n−1), a table having a size of m is required to be referred to 4n+5 times. In particular, in a case of achieving the reference through secure computation, a computation amount of O(m) is required to refer to the table having a size of m. Consequently, the entire computation amount is O(mn).

In view of the above point, the secure computation technology of the present invention has an object to compute Fisher's exact test efficiently through secure computation.

Means to Solve the Problems

To solve the above problems, a secure computation system of the present invention is a secure computation system comprising three or more secure computation devices, wherein a, b, c, and d are non-negative integers, a is a frequency on a first row and a first column in a 2×2 contingency table, b is a frequency on the first row and a second column in the contingency table, c is a frequency on the second row and the first column in the contingency table, d is a frequency on the second row and the second column in the contingency table, <a>, <b>, <c>, and <d> are secure text pieces of respective frequencies a, b, c, and d, and BatchRead($<\alpha>$; $<\beta>$; $j_0, \ldots, j_{m-1}$) represents a function of generating secure text ($<\alpha[\beta+j_0 \bmod n]>, \ldots, <\alpha[\beta+j_{m-1} \bmod n]>$) having a size of m from secure text $<\alpha>=(<\alpha[0]>, <\alpha[1]>, \ldots, <\alpha[n-1]>)$ having a size of n, the secure computation device comprises: a computation range determination part that determines $i_0$, $i_1$, $x_0$ and $x_1$ that satisfy $i_0 \leq i_1$ and $x_0 \leq x_1$; a preliminary computation part that computes $f(x_0), \ldots, f(x_1)$, and generates an array M= $(f(x_0), \ldots, f(x_1))$, for a freely selected function $f(x)$; a securing part that secures the array M, and generates a secure text array $<M>=(<f(x_0)>, \ldots, <f(x_i)>)$; and a batch-reading part that executes a following formulae, and generates a function value secure text ($<f(a_i)>$, $<f(b_i)>$, $<f(c_i)>$, $<f(d_i)>$) ($i_0 \leq i \leq i_1$), $$(<f(a_{i_0})>,<f(a_{i_0+1})>,\ldots,<f(a_{i_1})>) \leftarrow \text{BatchRead}(<M>; <a>;i_0,i_0+1,\ldots,i_1),$$

$$(<f(b_{i_0})>,<f(b_{i_0+1})>,\ldots,<f(b_{i_1})>) \leftarrow \text{BatchRead}(<M>; <b>;-i_0,-(i_0+1),\ldots,-i_1),$$

$$(<f(c_{i_0})>,<f(c_{i_0+1})>,\ldots,<f(c_{i_1})>) \leftarrow \text{BatchRead}(<M>; <c>;-i_0,-(i_0+1),\ldots,-i_1),$$

$$(<f(d_{i_0})>,<f(d_{i_0+1})>,\ldots,<f(d_{i_1})>) \leftarrow \text{BatchRead}(<M>; <d>;i_0,i_0+1,\ldots,i_1),$$

Effects of the Invention

According to the present invention, the values of functions of frequency $f(a_i)$, $f(b_i)$, $f(c_i)$, and $f(d_i)$, which are computation targets, can be efficiently obtained without disclosing the frequencies a, b, c, and d in the contingency table, which are to be inputs of Fisher's exact test. Consequently, Fisher's exact test can be efficiently computed through secure computation. Furthermore, Fisher's exact test can be executed, with the genome information being kept secret. That is, for example, execution results of Fisher's exact test on integrated data can be obtained while genome data items held by multiple research institutes are kept secret and are not disclosed to each other, an execution environment for genome analysis having a significantly high security level can be provided, and further development in healthcare can be expected accordingly.

DETAILED DESCRIPTION OF THE EMBODIMENTS

Figure 1:
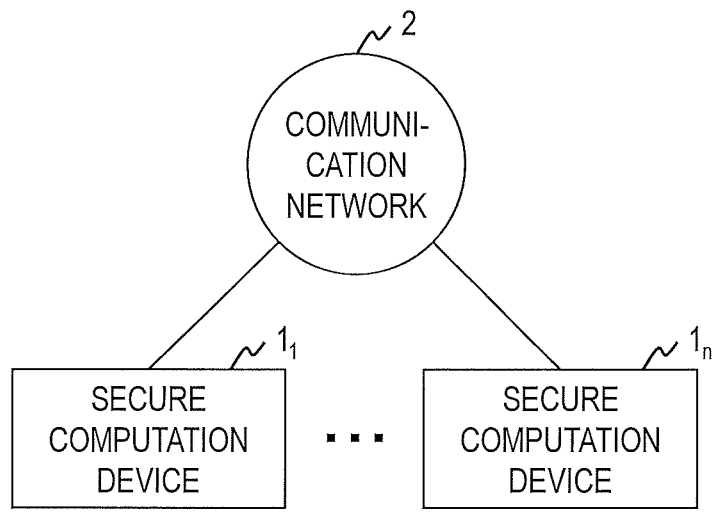
FIG. 1 is a diagram exemplifying a functional configuration of a secure computation system.

Prior to description of embodiments, notations in this Description and the definitions of terms used in this Description are described.

Notation

A value secured by applying encryption or secret sharing to a certain value "a" is called the secure text of "a" and is represented as $<a>$. Meanwhile, "a" is called the plain text of $<a>$. In a case where the securing is secret sharing, a set of the secret sharing fragments held by the individual parties according to $<a>$ is referred to.

Secure Shift

A process of adopting, as inputs, secure text array $<a>=(<a[0]>, <a[1]>, \ldots, <a[n-1]>)$ having a size of n, and secure text $<d>$ having a shift amount of d, and of computing a secure text array $<a'>=(<a[d]>, <a[d+1]>, \ldots, <a[n-1]>, <a[0]>, <a[d-1]>)$ with $<a>$ being shifted leftward by d, is called secure shift, and is described by the following formula.

$$<a'> \leftarrow \text{Shift}(<a>,<d>)$$

A method of achieving the secure shift is described in the following reference document 1.

[Reference Document 1] Koki Hamada, Naoto Kiribuchi, and Dai Ikarashi, "A round-efficient pattern matching algorithm for secure multi-party computation", Computer Security Symposium 2014, vol. 2014, pp. 674-681, October 2014

Batch-Reading Algorithm

A batch-reading algorithm adopts, as inputs, secure text array $<a>=(<a[0]>, <a[1]>, \ldots, <a[n-1]>)$ having a size of n, secure text $<x>$ of a natural number x representing a position, and m plain text pieces $j_0, j_1, \ldots, j_{m-1}$ representing a relative position from x, and obtains m secure text pieces $<b>=(<a[x+j_0 \bmod n]>, <a[x+j_1 \bmod n]>, \ldots, <a[x+j_{m-1} \bmod n]>)$ without disclosing the values of x and a[0], a[1], \ldots, a[n-1]. Hereinafter, the batch-reading algorithm is described by the following formula.

$$<b> \leftarrow \text{BatchRead}(<a>;<x>;j_0,j_1,\ldots,j_{m-1})$$

The batch-reading algorithm can be more efficiently executed by implementation as follows using the secure shift as described above. Note that the batch-reading algorithm applicable to the present invention is not limited thereto. Any algorithm capable of achieving the input and output described above is applicable. First, secure text array $<a>=(<a[0]>, <a[1]>, \ldots, <a[n-1]>)$ having a size of n, secure text $<x>$ of an integer x that is equal to or higher than 0 and less than n, and m plain text pieces $j_0, \ldots, j_{m-1}$ representing a relative position from x are input. Next, $<a'>=(<a'[0]>, <a'[1]>, \ldots, <a'[n-1]>)$, where array $<a>$ is shifted leftward by $<x>$, is obtained by $<a'> \leftarrow \text{Shift}(<a>,<x>)$. It is then assumed that $<b[k]>=<a'[j_k]>$ ($0 \leq k < m$), a secure text array $<b>=(<b[0]>, <b[1]>, \ldots, <b[m-1]>)=(<a'[j_0]>, <a'[j_1]>, \ldots, <a'[j_{m-1}]>)$ is generated.

Hereinafter, embodiments of the present invention are described in detail. In the diagrams, configuration parts having the same functions are assigned the same numerals, and redundant description thereof is omitted.

First Embodiment

A secure computation system of a first embodiment comprises n ($\geq 3$) secure computation devices $1_1, \ldots, 1_n$, as exemplified in FIG. 1. In this embodiment, the secure computation devices $1_1, \ldots, 1_n$ are each connected to a communication network 2. The communication network 2 is a communication network that is of a circuit switching scheme or a packet switching scheme and is configured to allow the secure computation devices $1_1, \ldots, 1_n$ to communicate with each other. For example, the Internet, a LAN (Local Area Network), a WAN (Wide Area Network) or the like may be used. Each device is not necessarily capable of communicating online via the communication network 2. For example, it may be configured such that information to be input into the secure computation devices $1_i (i \in \{1, \ldots, n\})$ may be stored in a portable recording medium, such as magnetic tape or a USB memory, and input may be performed offline from the portable recording medium.

Figure 2:
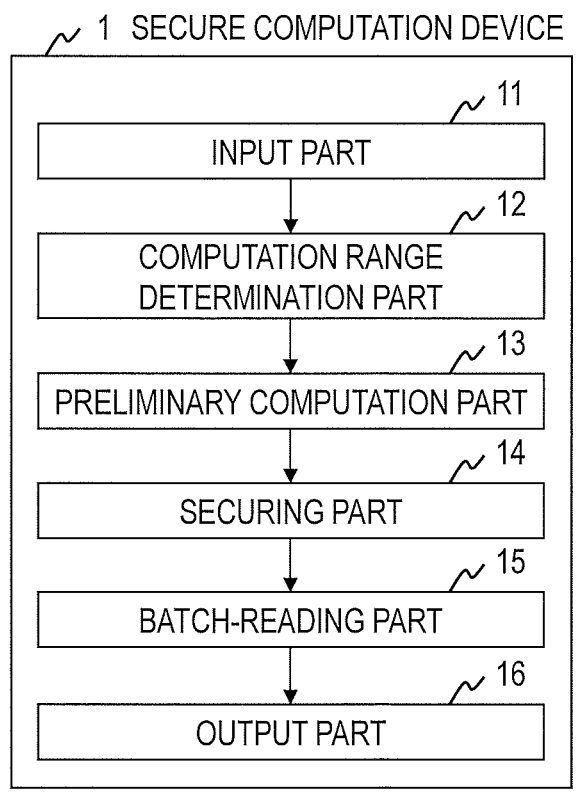
FIG. 2 is a diagram exemplifying a functional configuration of a secure computation device.

As exemplified in FIG. 2, the secure computation device 1 includes an input part 11, a computation range determination part 12, a preliminary computation part 13, a securing part 14, a batch-reading part 15, and an output part 16. The secure computation device 1 performs the process of each step exemplified in FIG. 3, thereby achieving a secure computation method of the first embodiment.

The secure computation device 1 is, for example, a special device configured to include a publicly known or dedicated computer which includes a central processing unit (CPU) and a main memory (RAM: Random Access Memory) and the like and into which a special program has been read. The secure computation device 1 executes each process under control by the central processing unit, for example. Data input into the secure computation device 1 and data obtained by each process are stored in the main memory, for example. The data stored in the main memory is read into the central processing unit as required, and is used for another process. At least some of the processing parts of the secure computation device 1 may be configured by hardware, such as an integrated circuit.

Figure 3:
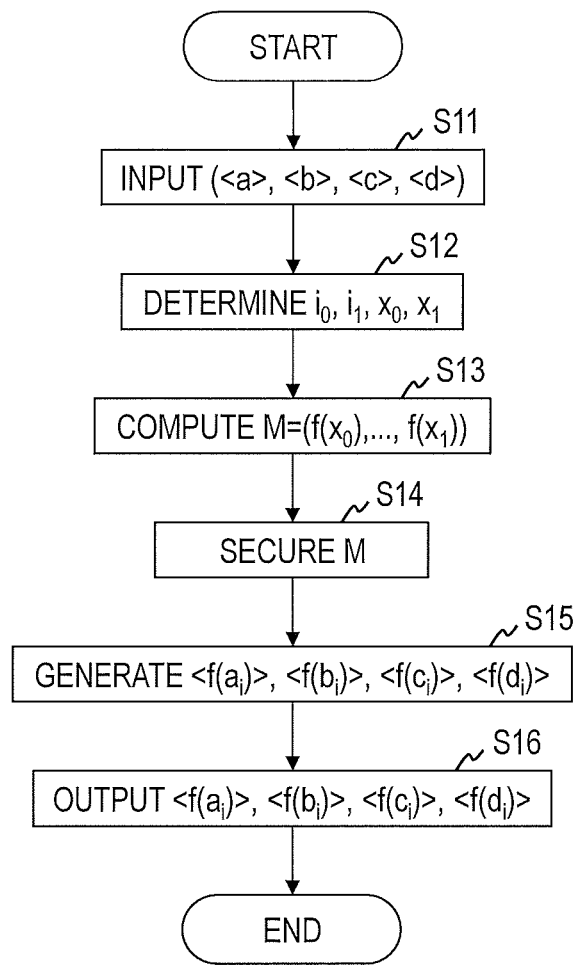
FIG. 3 is a diagram exemplifying processing procedures of a secure computation method.

Referring to FIG. 3, the processing procedures of the secure computation method of the first embodiment are described.

In step S11, a secure text ($<a>$, $<b>$, $<c>$, $<d>$) of a combination of frequencies (a, b, c, d) in a 2×2 contingency table is input into the input part 11. Here, the 2×2 contingency table is defined by the following formulae, and a, b, c and d are non-negative integers.

|                      | With event 1 | Without event 1 | Subtotal due to event 2 |
|----------------------|--------------|-----------------|-------------------------|
| With event 2         | a            | b               | $n_1 \bullet$           |
| Without event 2      | c            | d               | $n_2 \bullet$           |
| Subtotal due to event 1 | $n \bullet_1$ | $n \bullet_2$ | n                       |

In step S12, the computation range determination part 12 determines values $i_0$, $i_1$, $x_0$ and $x_1$ that satisfy $i_0 \leq i_1$ and $x_0 \leq x_1$. Here, it is determined that $i_0 = -n$, $i_1 = n$, $x_0 = -n$, and $x_1 = 2n$. The values $x_0$ and $x_1$ are transmitted to the preliminary computation part 13. The values $i_0$ and $i_1$ are transmitted to the batch-reading part 15.

In step S13, as for the function $f(x)$, the preliminary computation part 13 computes $f(x_0), f(x_0+1), \ldots, f(x_1)$, and generates an array $M = (f(x_0), f(x_0+1), \ldots, f(x_1))$. In the first embodiment, to compute the probability $p_i$ ($i_0 \leq i \leq i_1$) defined by the following equation, the function $f(x)$ is defined as $f(x) := x!$.

$$p_i = \frac{f(a+b)f(c+d)f(a+c)f(b+d)}{f(a+b+c+d)f(a_i)f(b_i)f(c_i)f(d_i)}$$

In step S14, the securing part 14 generates a secure text array $<M> = (<f(x_0)>, <f(x_0+1)>, \ldots, <f(x_1)>)$ where the array M is secured. The secure text array $<M>$ is transmitted to the batch-reading part 15.

In step S15, the batch-reading part 15 executes the following formulae, and generates a function value secure text ($<f(a_i)>$, $<f(b_i)>$, $<f(c_i)>$, $<f(d_i)>$) ($i = i_0, \ldots, i_1$).

$$(<f(a_{i_0})>, <f(a_{i_0+1})>, \ldots, <f(a_{i_1})>) \leftarrow \text{BatchRead}(<M>; <a>; i_0, i_0+1, \ldots, i_1),$$

$$(<f(b_{i_0})>, <f(b_{i_0+1})>, \ldots, <f(b_{i_1})>) \leftarrow \text{BatchRead}(<M>; <b>; -i_0, -(i_0+1), \ldots, -i_1),$$

$$(<f(c_{i_0})>, <f(c_{i_0+1})>, \ldots, <f(c_{i_1})>) \leftarrow \text{BatchRead}(<M>; <c>; -i_0, -(i_0+1), \ldots, -i_1),$$

$$(<f(d_{i_0})>, <f(d_{i_0+1})>, \ldots, <f(d_{i_1})>) \leftarrow \text{BatchRead}(<M>; <d>; i_0, i_0+1, \ldots, i_1),$$

In step S16, the function value secure text ($<f(a_i)>$, $<f(b_i)>$, $<f(c_i)>$, $<f(d_i)>$) is output from the output part 16.

Second Embodiment

Referring to FIG. 3, the processing procedures of the secure computation method of a second embodiment are described. Hereinafter, differences from the first embodiment described above are mainly described.

In step S13, as for the function $f(x)$, the preliminary computation part 13 computes $f(x_0), f(x_0+1), \ldots, f(x_1)$, and generates an array $M = (f(x_0), f(x_0+1), \ldots, f(x_1))$. In the second embodiment, the probabilities $\log p_i$ ($i_0 \leq i \leq i_1$) defined by the following equation are computed and then the probabilities $p_i = \exp(\log p_i)$ are computed, the function $f(x)$ is defined as $f(x) := \log(x!)$.

$$\log p_i = f(a+b) + f(c+d) + f(a+c) + f(b+d) - f(a+b+c+d) - f(a_i) - f(b_i) - f(c_i) - f(d_i)$$

The point of the present invention is to utilize the fact that the differences of inputs $a_{i0}, a_{i0+1}, \ldots, a_{i1}$ of function values $f(a_{i0}), f(a_{i0+1}), \ldots, f(a_{i1})$ are information allowed to be disclosed, to achieve computation of function value secure text $<f(a_{i0})>, <f(a_{i0+1})>, \ldots, <f(a_i)>$ efficiently, using the batch-reading algorithm.

By such a configuration, according to the secure computation technology of the present invention, multiple table references are collectively executed, thereby allowing Fisher's exact test to be efficiently computed. The computation amount of batch reading from an array having a size of n is $O(n)$. Consequently, provided that $1 + i_1 - i_0 = K$ and $1 + x_1 - x_0 = L$, the entire computation amount is improved from $O(KL)$ to $O(L)$.

The embodiments of the present invention have thus been described above. However, the specific configuration is not limited to that in these embodiments. Even if the design is appropriately changed in a range without departing from the spirit of the present invention, it is a matter of course that the configuration is included in the present invention. The various processes described in the embodiments can be executed in a time-series manner according to the order of the description. Alternatively, such execution may be performed in parallel or individually, in conformity with the processing capability of the device that executes the processes, or as required.

Program and Recording Medium

In the cases where the various processing functions in each device described in the embodiments are implemented with a computer, the processing content of the functions that each device should have is described as a program. The program is executed by the computer, thereby achieving the various processing functions in each device described above on the computer.

The program that describes the processing content can be preliminarily recorded in a computer-readable recording medium. The computer-readable recording medium may be, for example, any computer-readable recording medium, such as a magnetic recording device, an optical disk, a magneto-optical recording medium, or a semiconductor memory.

The program is distributed by, for example, selling, transferring, or lending a portable recording medium, such as DVD or CD-ROM, where the program is recorded. Alternatively, a configuration may be adopted where the program may be preliminarily stored in a storing device of a server computer, and the program may be transferred from the server computer to another computer via a network, thereby distributing the program.

For example, the computer for executing such a program, first, stores the program recorded in a portable recording medium or transferred from a server computer, temporarily in its storing device. At the time of executing the process, the computer reads the program recorded in its recording medium, and executes the processes according to the read program.

According to another execution mode of this program, the computer may directly read the program from the portable recording medium, and execute the processes according to the program. Further alternatively, every time the program is transferred to the computer from the server computer, the computer may successively execute the process according to the received program. Another configuration may be adopted that executes the processes described above through a service of what is called an ASP (Application Service Provider) type according to which the program is not transferred from the server computer to the computer concerned, and the processing function is achieved only by an execution instruction therefor and acquisition of the result. The program according to the embodiments include information that is provided for the processes by the computer and conforms to the program (data and the like that are not direct instructions to the computer but have characteristics defining the processes of the computer).

According to the embodiments, this device is thus configured by executing a predetermined program on the computer. Alternatively, at least a part of the processing content may be achieved as hardware.

INDUSTRIAL APPLICABILITY

The secure computation technology of the present invention is applicable to, for example, execution of Fisher's exact test through secure computation with genome information being kept secure, in genome wide association study that deals with sensitive information.

What is claimed is:

1. A secure computation system comprising three or more secure computation devices, wherein the secure computation system generates a function value secure text ($<f(a_i)>$, $<f(b_i)>$, $<f(c_i)>$, $<f(d_i)>$) ($i_0 \leq i \leq i_1$) for computing a secret text of a probability $p_i$ ($i_0 \leq i \leq i_1$) defined by a following equation:

$$p_i = \frac{f(a+b)f(c+d)f(a+c)f(b+d)}{f(a+b+c+d)f(a_i)f(b_i)f(c_i)f(d_i)},$$

wherein $f(x):=x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $<a>$, $<b>$, $<c>$, and $<d>$ are secure text pieces of respective frequencies a, b, c, and d, $<\alpha>=(<\alpha[0]>, <\alpha[1]>, \ldots, <\alpha[n-1]>)$ is a secure text array having a size of n, $<\beta>$ is a secret text of a position in the secure text array $<\alpha>$, $j_0, \ldots, j_{m-1}$ are relative positions from $\beta$, BatchRead($<\alpha>$; $<\beta>$; $j_0, \ldots, j_{m-1}$) represents a function of generating a secure text ($<\alpha[\beta+j_0 \bmod n]>, \ldots, <\alpha[\beta+j_{m-1} \bmod n]>$) having a size of m by batch-reading elements at positions $\beta+j_0 \bmod n, \ldots, \beta+j_{m-1} \bmod n$ from the secure text $<\alpha>$, $i_0 \leq \max(-a, -d)$, $\min(b, c) \leq i_1$, $x_0 \leq \min(a+i_0, b-i_1, c-i_1, d+i_0)$, and $\max(n, a+i_1, b-i_1, c-i_1, d+i_0) \leq x_1$, each of the three or more secure computation devices comprises circuitry configured to:
receive, over a network, an input of the secure texts ($<a>$, $<b>$, $<c>$, $<d>$), wherein the original respective frequencies a, b, c and d are concealed from each of the secret computation devices;
determine $i_0, i_1, x_0$ and $x_1$ that satisfy $i_0 \leq i_1$ and $x_0 \leq x_1$;
compute $f(x_0), \ldots, f(x_1)$, and generate an array $M=(f(x_0), \ldots, f(x_1))$;
secure the array M, and generate a secure text array $<M>=(<f(x_0)>, \ldots, <f(x_1)>)$;
execute following formulae, and generate the function value secure text ($<f(a_i)>$, $<f(b_i)>$, $<f(c_i)>$, $<f(d_i)>$) ($i_0 \leq i \leq i_1$), $(<f(a_{i_0})>, <f(a_{i_0+1})>, \ldots, <f(a_{i_1})>) \leftarrow$ BatchRead($<M>$; $<a>; i_0, i_0+1, \ldots, i_1$), $(<f(b_{i_0})>, <f(b_{i_0+1})>, \ldots, <f(b_{i_1})>) \leftarrow$ BatchRead($<M>$; $<b>; -i_0, -(i_0+1), \ldots, -i_1$), $(<f(c_{i_0})>, <f(c_{i_0+1})>, \ldots, <f(c_{i_1})>) \leftarrow$ BatchRead($<M>$; $<c>; -i_0, -(i_0+1), \ldots, -i_1$), $(<f(d_{i_0})>, <f(d_{i_0+1})>, \ldots, <f(d_{i_1})>) \leftarrow$ BatchRead($<M>$; $<d>; i_0, i_0+1, \ldots, i_1$);

and
output the function value secure text ($<f(a_i)>$, $<f(b_i)>$, $<f(c_i)>$, $<f(d_i)>$).

2. A secure computation device configured to operate in a secure computation system comprising three or more secure computation devices, wherein the secure computation device generates a function value secure text ($<f(a_i)>$, $<f(b_i)>$, $<f(c_i)>$, $<f(d_i)>$) ($i_0 \leq i \leq i_1$) for computing a secret text of a probability $p_i$ ($i_0 \leq i \leq i_1$) defined by a following equation:

$$p_i = \frac{f(a+b)f(c+d)f(a+c)f(b+d)}{f(a+b+c+d)f(a_i)f(b_i)f(c_i)f(d_i)},$$

wherein $f(x):=x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $<a>$, $<b>$, $<c>$, and $<d>$ are secure text pieces of respective frequencies a, b, c, and d, $<\alpha>=(<\alpha[0]>,$ $<\alpha[1]>, \ldots, <\alpha[n-1]>$) is a secure text array having a size of n, $<\beta>$ is a secret text of a position in the secure text array $<\alpha>$, $j_0, \ldots, j_{m-1}$ are relative positions from β, BatchRead($<\alpha>$; $<\beta>$; $j_0, \ldots, j_{m-1}$) represents a function of generating a secure text ($<\alpha[\beta+j_0 \bmod n]>, \ldots, <\alpha[\beta+j_{m-1} \bmod n]>$) having a size of m by batch-reading elements at positions $\beta+j_0 \bmod n, \ldots, \beta+j_{m-1} \bmod n$ from the secure text $<\alpha>$, $i_0 \leq \max(-a, -d)$, $\min(b, c) \leq i_1$, $x_0 \leq \min(a+i_0, b-i_1, c-i_1, d+i_0)$, and $\max(n, a+i_1, b-i_1, c-i_1, d+i_0) \leq x_1$, the secure computation device comprises circuitry configured to:

receive, over a network, an input of the secure texts ($<a>, <b>, <c>, <d>$), wherein the original respective frequencies a, b, c and d are concealed from each of the secret computation devices;

determine $i_0$, $i_1$, $x_0$ and $x_1$ that satisfy and $i_0 \leq i_1$ and $x_0 \leq x_1$;

compute $f(x_0), \ldots, f(x_1)$, and generate an array $M=(f(x_0), \ldots, f(x_1))$;

secure the array M, and generate a secure text array $<M>=(<f(x_0)>, \ldots, <f(x_1)>)$;

execute following formulae, and generate the function value secure text ($<f(a_i)>, <f(b_i)>, <f(c_i)>, <f(d_i)>$) ($i_0 \leq i \leq i_1$), $$(<f(a_{i_0})>, <f(a_{i_0+1})>, \ldots, <f(a_{i_1})>) \leftarrow \text{BatchRead}(<M>; <a>; i_0, i_0+1, \ldots, i_1),$$

$$(<f(b_{i_0})>, <f(b_{i_0+1})>, \ldots, <f(b_{i_1})>) \leftarrow \text{BatchRead}(<M>; <b>; -i_0, -(i_0+1), \ldots, -i_1),$$

$$(<f(c_{i_0})>, <f(c_{i_0+1})>, \ldots, <f(c_{i_1})>) \leftarrow \text{BatchRead}(<M>; <c>; -i_0, -(i_0+1), \ldots, -i_1),$$

$$(<f(d_{i_0})>, <f(d_{i_0+1})>, \ldots, <f(d_{i_1})>) \leftarrow \text{BatchRead}(<M>; <d>; i_0, i_0+1, \ldots, i_1);$$

and output the function value secure text ($<f(a_i)>, <f(b_i)>, <f(c_i)>, <f(d_i)>$).

3. A secure computation method executed by a secure computation system comprising three or more secure computation devices, wherein the secure computation method generates a function value secure text ($<f(a_i)>, <f(b_i)>, <f(c_i)>, <f(d_i)>$) ($i_0 \leq i \leq i_1$) for computing a secret text of a probability $p_i$ ($i_0 \leq i \leq i_1$) defined by a following equation:

$$p_i = \frac{f(a+b)f(c+d)f(a+c)f(b+d)}{f(a+b+c+d)f(a_i)f(b_i)f(c_i)f(d_i)},$$

wherein $f(x):=x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $<a>$, $<b>$, $<c>$, and $<d>$ are secure text pieces of respective frequencies a, b, c, and d, $<\alpha>=(<\alpha[0]>, <\alpha[1]>, \ldots, <\alpha[n-1]>)$ is a secure text array having a size of n, $<\beta>$ is a secret text of a position in the secure text array $<\alpha>$, $j_0, \ldots, j_{m-1}$ are relative positions from β, BatchRead($<\alpha>$; $<\beta>$; $j_0, \ldots, j_{m-1}$) represents a function of generating a secure text ($<\alpha[\beta+j_0 \bmod n]>, \ldots, <\alpha[\beta+j_{m-1} \bmod n]>$) having a size of m by batch-reading elements at positions $\beta+j_0 \bmod n, \ldots, \beta+j_{m-1} \bmod n$ from the secure text $<\alpha>$, $i_0 \leq \max(-a, -d)$, $\min(b, c) \leq i_1$, $x_0 \leq \min(a+i_0, b-i_1, c-i_1, d+i_0)$, and $\max(n, a+i_1, b-i_1, c-i_1, d+i_0) \leq x_1$, the secure computation method comprising, by each of the three or more secure computation devices:

receive, over a network, an input of the secure texts ($<a>, <b>, <c>, <d>$), wherein the original respective frequencies a, b, c and d are concealed from each of the secret computation devices;

determining $i_0$, $i_1$, $x_0$ and $x_1$ that satisfy $i_0 \leq i_1$ and $x_1 \leq x_1$ by circuitry of each of the three or more secure computation devices;

computing $f(x_0), \ldots, f(x_1)$, and generating an array $M=(f(x_0), \ldots, f(x_1))$ by the circuitry of each of the three or more secure computation devices;

securing the array M, and generating a secure text array $<M>=(<f(x_0)>, \ldots, <f(x_1)>)$ by the circuitry of each of the three or more secure computation devices; and executing following formulae, and generating the function value secure text ($<f(a_i)>, <f(b_i)>, <f(c_i)>, <f(d_i)>$) ($i_0 \leq i \leq i_1$) by the circuitry of each of the three or more secure computation devices, $$(<f(a_{i_0})>, <f(a_{i_0+1})>, \ldots, <f(a_{i_1})>) \leftarrow \text{BatchRead}(<M>; <a>; i_0, i_0+1, \ldots, i_1),$$

$$(<f(b_{i_0})>, <f(b_{i_0+1})>, \ldots, <f(b_{i_1})>) \leftarrow \text{BatchRead}(<M>; <b>; -i_0, -(i_0+1), \ldots, -i_1),$$

$$(<f(c_{i_0})>, <f(c_{i_0+1})>, \ldots, <f(c_{i_1})>) \leftarrow \text{BatchRead}(<M>; <c>; -i_0, -(i_0+1), \ldots, -i_1),$$

$$(<f(d_{i_0})>, <f(d_{i_0+1})>, \ldots, <f(d_{i_1})>) \leftarrow \text{BatchRead}(<M>; <d>; i_0, i_0+1, \ldots, i_1);$$

and outputting the function value secure text ($<f(a_i)>, <f(b_i)>, <f(c_i)>, <f(d_i)>$).

4. A non-transitory computer readable medium including computer executable instructions that make a secure computation device, configured to operate in a secure computation system comprising three or more secure computation devices, perform a method, wherein the method generates a function value secure text ($<f(a_i)>, <f(b_i)>, <f(c_i)>, <f(d_i)>$) ($i_0 \leq i \leq i_1$) for computing a secret text of a probability $p_i$ ($i_0 \leq i \leq i_1$) defined by a following equation:

$$p_i = \frac{f(a+b)f(c+d)f(a+c)f(b+d)}{f(a+b+c+d)f(a_i)f(b_i)f(c_i)f(d_i)},$$

wherein $f(x):=x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $<a>$, $<b>$, $<c>$, and $<d>$ are secure text pieces of respective frequencies a, b, c, and d, $<\alpha>=(<\alpha[0]>, <\alpha[1]>, \ldots, <\alpha[n-1]>)$ is a secure text array having a size of n, $<\beta>$ is a secret text of a position in the secure text array $<\alpha>$, $j_0, \ldots, j_{m-1}$ are relative positions from β, BatchRead($<\alpha>$; $<\beta>$; $j_0, \ldots, j_{m-1}$) represents a function of generating a secure text ($<\alpha[\beta+j_0 \bmod n]>, \ldots, <\alpha[\beta+j_{m-1} \bmod n]>$) having a size of m by batch-reading elements at positions $\beta+j_0 \bmod n, \ldots,$ $\beta+j_{m-1}$ mod n from the secure text $<\alpha>$, $i_0 \le \max(-a, -d)$, $\min(b, c) \le i_1$, $x_0 \le \min(a+i_0, b-i_1, c-i_1, d+i_0)$, and $\max(n, a+i_1, b-i_1, c-i_1, d+i_0) \le x_1$, the method comprising:

receiving, over a network, an input of the secure texts ($<a>$, $<b>$, $<c>$, $<d>$), wherein the original respective frequencies a, b, c and d are concealed from each of the secret computation devices;

determining $i_0$, $i_1$, $x_0$ and $x_1$ that satisfy and $i_0 \le i_1$ and $x_0 \le x_1$;

computing $f(x_0), \ldots, f(x_1)$, and generating an array $M = (f(x_0), \ldots, f(x_1))$;

securing the array M, and generating a secure text array $<M> = (<f(x_0)>, \ldots, <f(x_1)>)$;

executing following formulae, and generating the function value secure text ($<f(a_i)>$, $<f(b_i)>$, $<f(c_i)>$, $<f(d_i)>$) ($i_0 \le i \le i_1$), $(<f(a_{i_0})>, <f(a_{i_0+1})>, \ldots, <f(a_{i_1})>) \leftarrow \text{BatchRead}(<M>; <a>; i_0, i_0+1, \ldots, i_1)$, $(<f(b_{i_0})>, <f(b_{i_0+1})>, \ldots, <f(b_{i_1})>) \leftarrow \text{BatchRead}(<M>; <b>; -i_0, -(i_0+1), \ldots, -i_1)$, $(<f(c_{i_0})>, <f(c_{i_0+1})>, \ldots, <f(c_{i_1})>) \leftarrow \text{BatchRead}(<M>; <c>; -i_0, -(i_0+1), \ldots, -i_1)$, $(<f(d_{i_0})>, <f(d_{i_0+1})>, \ldots, <f(d_{i_1})>) \leftarrow \text{BatchRead}(<M>; <d>; i_0, i_0+1, \ldots, i_1)$;

and outputting the function value secure text ($<f(a_i)>$, $<f(b_i)>$, $<f(c_i)>$, $<f(d_i)>$).

5. A secure computation system comprising three or more secure computation devices, wherein the secure computation system generates a function value secure text ($<f(a_i)>$, $<f(b_i)>$, $<f(c_i)>$, $<f(d_i)>$) ($i_0 \le i \le i_1$) for computing a secret text of a probability $p_i$ ($i_0 \le i \le i_1$) defined by a following equation:

$\log p_i = f(a+b) + f(c+d) + f(a+c) + f(b+d) - f(a+b+c+d) - f(a_i) - f(b_i) - f(c_i) - f(d_i)$, wherein $f(x) := x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $<a>$, $<b>$, $<c>$, and $<d>$ are secure text pieces of respective frequencies a, b, c, and d, $<\alpha> = (<\alpha[0]>, <\alpha[1]>, \ldots, <\alpha[n-1]>)$ is a secure text array having a size of n, $<\beta>$ is a secret text of a position in the secure text array $<\alpha>$, $j_0, \ldots, j_{m-1}$ are relative positions from $\beta$, BatchRead($<\alpha>$; $<\beta>$; $j_0, \ldots, j_{m-1}$) represents a function of generating a secure text ($<\alpha[\beta+j_0 \bmod n]>, \ldots, <\alpha[\beta+j_{m-1} \bmod n]>$) having a size of m by batch-reading elements at positions $\beta+j_0$ mod n, ..., $\beta+j_{m-1}$ mod n from the secure text $<\alpha>$, $i_0 \le \max(-a, -d)$, $\min(b, c) \le i_1$, $x_0 \le \min(a+i_0, b-i_1, c-i_1, d+i_0)$, and $\max(n, a+i_1, b-i_1, c-i_1, d+i_0) \le x_1$, each of the secure computation devices comprises circuitry configured to:

receive, over a network, an input of the secure texts ($<a>$, $<b>$, $<c>$, $<d>$), wherein the original respective frequencies a, b, c and d are concealed from each of the secret computation devices;

determine $i_0$, $i_1$, $x_0$ and $x_1$ that satisfy $i_0 \le i_1$ and $x_0 \le x_1$;

compute $f(x_0), \ldots, f(x_1)$, and generate an array $M = (f(x_0), \ldots, f(x_1))$;

secure the array M, and generate a secure text array $<M> = (<f(x_0)>, \ldots, <f(x_1)>)$;

execute following formulae, and generate the function value secure text ($<f(a_i)>$, $<f(b_i)>$, $<f(c_i)>$, $<f(d_i)>$) ($i_0 \le i \le i_1$), $(<f(a_{i_0})>, <f(a_{i_0+1})>, \ldots, <f(a_{i_1})>) \leftarrow \text{BatchRead}(<M>; <a>; i_0, i_0+1, \ldots, i_1)$, $(<f(b_{i_0})>, <f(b_{i_0+1})>, \ldots, <f(b_{i_1})>) \leftarrow \text{BatchRead}(<M>; <b>; -i_0, -(i_0+1), \ldots, -i_1)$, $(<f(c_{i_0})>, <f(c_{i_0+1})>, \ldots, <f(c_{i_1})>) \leftarrow \text{BatchRead}(<M>; <c>; -i_0, -(i_0+1), \ldots, -i_1)$, $(<f(d_{i_0})>, <f(d_{i_0+1})>, \ldots, <f(d_{i_1})>) \leftarrow \text{BatchRead}(<M>; <d>; i_0, i_0+1, \ldots, i_1)$;

and output the function value secure text ($<f(a_i)>$, $<f(b_i)>$, $<f(c_i)>$, $<f(d_i)>$).

6. A secure computation device configured to operate in a secure computation system comprising three or more secure computation devices, wherein the secure computation device generates a function value secure text ($<f(a_i)>$, $<f(b_i)>$, $<f(c_i)>$, $<f(d_i)>$) ($i_0 \le i \le i_1$) for computing a secret text of a probability $p_i$ ($i_0 \le i \le i_1$) defined by a following equation:

$\log p_i = f(a+b) + f(c+d) + f(a+c) + f(b+d) - f(a+b+c+d) - f(a_i) - f(b_i) - f(c_i) - f(d_i)$, wherein $f(x) := x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $<a>$, $<b>$, $<c>$, and $<d>$ are secure text pieces of respective frequencies a, b, c, and d, $<\alpha> = (<\alpha[0]>, <\alpha[1]>, \ldots, <\alpha[n-1]>)$ is a secure text array having a size of n, $<\beta>$ is a secret text of a position in the secure text array $<\alpha>$, $j_0, \ldots, j_{m-1}$ are relative positions from $\beta$, BatchRead($<\alpha>$; $<\beta>$; $j_0, \ldots, j_{m-1}$) represents a function of generating a secure text ($<\alpha[\beta+j_0 \bmod n]>, \ldots, <\alpha[\beta+j_{m-1} \bmod n]>$) having a size of m by batch-reading elements at positions $\beta+j_0$ mod n, ..., $\beta+j_{m-1}$ mod n from the secure text $<\alpha>$, $i_0 \le \max(-a, -d)$, $\min(b, c) \le i_1$, $x_0 \le \min(a+i_0, b-i_1, c-i_1, d+i_0)$, and $\max(n, a+i_1, b-i_1, c-i_1, d+i_0) \le x_1$, the secure computation device comprises circuitry configured to:

receive, over a network, an input of the secure texts ($<a>$, $<b>$, $<c>$, $<d>$), wherein the original respective frequencies a, b, c and d are concealed from each of the secret computation devices;

determine $i_0$, $i_1$, $x_0$ and $x_1$ determine $i_0$, $i_1$, $x_0$ and $x_1$ that satisfy and $i_0 \le i_1$ and $x_0 \le x_1$;

compute $f(x_0), \ldots, f(x_1)$, and generate an array $M = (f(x_0), \ldots, f(x_1))$;

secure the array M, and generate a secure text array $<M> = (<f(x_0)>, \ldots, <f(x_1)>)$; and execute following formulae, and generate the function value secure text ($<f(a_i)>$, $<f(b_i)>$, $<f(c_i)>$, $<f(d_i)>$) ($i_0 \le i \le i_1$), $(<f(a_{i_0})>, <f(a_{i_0+1})>, \ldots, <f(a_{i_1})>) \leftarrow \text{BatchRead}(<M>; <a>; i_0, i_0+1, \ldots, i_1)$, $(<f(b_{i_0})>, <f(b_{i_0+1})>, \ldots, <f(b_{i_1})>) \leftarrow \text{BatchRead}(<M>; <b>; -i_0, -(i_0+1), \ldots, -i_1)$, $$(\langle f(c_{i_0})\rangle, \langle f(c_{i_0+1})\rangle, \ldots, \langle f(c_{i_1})\rangle) \leftarrow \text{BatchRead}(\langle M\rangle;$$
$$\langle c\rangle; -i_0, -(i_0+1), \ldots, -i_1),$$

$$(\langle f(d_{i_0})\rangle, \langle f(d_{i_0+1})\rangle, \ldots, \langle f(d_{i_1})\rangle) \leftarrow \text{BatchRead}(\langle M\rangle;$$
$$\langle d\rangle; i_0, i_0+1, \ldots, i_1);$$

and output the function value secure text ($\langle f(a_i)\rangle$, $\langle f(b_i)\rangle$, $\langle f(c_i)\rangle$, $\langle f(d_i)\rangle$.

7. A secure computation method executed by a secure computation system comprising three or more secure computation devices, wherein the secure computation method generates a function value secure text ($\langle f(a_i)\rangle$, $\langle f(b_i)\rangle$, $\langle f(c_i)\rangle$, $\langle f(d_i)\rangle$) ($i_0 \leq i \leq i_1$) for computing a secret text of a probability $p_i$ ($i_0 \leq i \leq i_1$) defined by a following equation:

$$\log p_i = f(a+b) + f(c+d) + f(a+c) + f(b+d) - f(a+b+c+d) - f(a_i) - f(b_i) - f(c_i) - f(d_i),$$

wherein $f(x) := x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $\langle a\rangle$, $\langle b\rangle$, $\langle c\rangle$, and $\langle d\rangle$ are secure text pieces of respective frequencies a, b, c, and d, $\langle \alpha\rangle := (\langle \alpha[0]\rangle, \langle \alpha[1]\rangle, \ldots, \langle \alpha[n-1]\rangle)$ is a secure text array having a size of n, $\langle \beta\rangle$ is a secret text of a position in the secure text array $\langle \alpha\rangle$, $j_0, \ldots, j_{m-1}$ are relative positions from $\beta$, BatchRead($\langle \alpha\rangle$; $\langle \beta\rangle$; $j_0, \ldots, j_{m-1}$) represents a function of generating a secure text ($\langle \alpha[\beta+j_0 \bmod n]\rangle, \ldots, \langle \alpha[\beta+j_{m-1} \bmod n]\rangle$) having a size of m by batch-reading elements at positions $\beta+j_0 \bmod n, \ldots, \beta+j_{m-1} \bmod n$ from the secure text $\langle \alpha\rangle$, $i_0 \leq \max(-a, -d)$, $\min(b, c) \leq i_1$, $x_0 \leq \min(a+i_0, b-i_1, c-i_1, d+i_0)$, and $\max(n, a+i_1, b-i_1, c-i_1, d+i_0) \leq x_1$, the secure computation method comprising by each of the three or more secure computation devices:

receiving, over a network, an input of the secure texts ($\langle a\rangle$, $\langle b\rangle$, $\langle c\rangle$, $\langle d\rangle$), wherein the original respective frequencies a, b, c and d are concealed from each of the secret computation devices;

determining $i_0$, $i_1$, $x_0$ and $x_1$ that satisfy and $x_0 \leq x_1$ by circuitry of each of the three or more secure computation devices;

computing $f(x_0), \ldots, f(x_1)$, and generating an array $M = (f(x_0), \ldots, f(x_1))$, for a freely selected function $f(x)$ by the circuitry of each of the secure computation devices;

securing the array M, and generating a secure text array $\langle M\rangle := (\langle f(x_0)\rangle, \ldots, \langle f(x_1)\rangle)$ by the circuitry of each of the secure computation devices; and executing following formulae, and generating the function value secure text ($\langle f(a_i)\rangle$, $\langle f(b_i)\rangle$, $\langle f(c_i)\rangle$, $\langle f(d_i)\rangle$) ($i_0 \leq i \leq i_1$) by the circuitry of each of the secure computation devices, $$(\langle f(a_{i_0})\rangle, \langle f(a_{i_0+1})\rangle, \ldots, \langle f(a_{i_1})\rangle) \leftarrow \text{BatchRead}(\langle M\rangle;$$
$$\langle a\rangle; i_0, i_0+1, \ldots, i_1),$$

$$(\langle f(b_{i_0})\rangle, \langle f(b_{i_0+1})\rangle, \ldots, \langle f(b_{i_1})\rangle) \leftarrow \text{BatchRead}(\langle M\rangle;$$
$$\langle b\rangle; -i_0, -(i_0+1), \ldots, -i_1),$$

$$(\langle f(c_{i_0})\rangle, \langle f(c_{i_0+1})\rangle, \ldots, \langle f(c_{i_1})\rangle) \leftarrow \text{BatchRead}(\langle M\rangle;$$
$$\langle c\rangle; -i_0, -(i_0+1), \ldots, -i_1),$$

$$(\langle f(d_{i_0})\rangle, \langle f(d_{i_0+1})\rangle, \ldots, \langle f(d_{i_1})\rangle) \leftarrow \text{BatchRead}(\langle M\rangle;$$
$$\langle d\rangle; i_0, i_0+1, \ldots, i_1);$$

and outputting the function value secure text ($\langle f(a_i)\rangle$, $\langle f(b_i)\rangle$, $\langle f(c_i)\rangle$, $\langle f(d_i)\rangle$.

8. A non-transitory computer readable medium including computer executable instructions that make a secure computation device, configured to operate in a secure computation system comprising three or more secure computation devices, perform a method, wherein the method generates a function value secure text ($\langle f(a_i)\rangle$, $\langle f(b_i)\rangle$, $\langle f(c_i)\rangle$, $\langle f(d_i)\rangle$) ($i_0 \leq i \leq i_1$) for computing a secret text of a probability $p_i$ ($i_0 \leq i \leq i_1$) defined by a following equation:

$$\log p_i = f(a+b) + f(c+d) + f(a+c) + f(b+d) - f(a+b+c+d) - f(a_i) - f(b_i) - f(c_i) - f(d_i),$$

wherein $f(x) := x!$, a, b, c, and d are non-negative integers, a is a frequency on a first row and a first column in a 2×2 contingency table, b is a frequency on the first row and a second column in the contingency table, c is a frequency on a second row and the first column in the contingency table, d is a frequency on the second row and the second column in the contingency table, $\langle a\rangle$, $\langle b\rangle$, $\langle c\rangle$, and $\langle d\rangle$ are secure text pieces of respective frequencies a, b, c, and d, $\langle \alpha\rangle := (\langle \alpha[0]\rangle, \langle \alpha[1]\rangle, \ldots, \langle \alpha[n-1]\rangle)$ is a secure text array having a size of n, $\langle \beta\rangle$ is a secret text of a position in the secure text array $\langle \alpha\rangle$, $j_0, \ldots, j_{m-1}$ are relative positions from $\beta$, BatchRead($\langle \alpha\rangle$; $\langle \beta\rangle$; $j_0, \ldots, j_{m-1}$) represents a function of generating a secure text ($\langle \alpha[\beta+j_0 \bmod n]\rangle, \ldots, \langle \alpha[\beta+j_{m-1} \bmod n]\rangle$) having a size of m by batch-reading elements at positions $\beta+j_0 \bmod n, \ldots, \beta+j_{m-1} \bmod n$ from the secure text $\langle \alpha\rangle$, $i_0 \leq \max(-a, -d)$, $\min(b, c) \leq i_1$, $x_0 \leq \min(a+i_0, b-i_1, c-i_1, d+i_0)$, and $\max(n, a+i_1, b-i_1, c-i_1, d+i_0) \leq x_1$, the method comprising:

receiving, over a network, an input of the secure texts ($\langle a\rangle$, $\langle b\rangle$, $\langle c\rangle$, $\langle d\rangle$), wherein the original respective frequencies a, b, c and d are concealed from each of the secret computation devices;

determining $i_0$, $i_1$, $x_0$ and $x_1$ that satisfy $i_0 \leq i_1$ and $x_0 \leq x_1$;

computing $f(x_0), \ldots, f(x_1)$, and generating an array $M = (f(x_0), \ldots, f(x_1))$, for a freely selected function $f(x)$;

securing the array M, and generating a secure text array $\langle M\rangle := (\langle f(x_0)\rangle, \ldots, \langle f(x_1)\rangle)$;

executing following formulae, and generating the function value secure text ($\langle f(a_i)\rangle$, $\langle f(b_i)\rangle$, $\langle f(c_i)\rangle$, $\langle f(d_i)\rangle$) ($i_0 \leq i \leq i_1$), $$(\langle f(a_{i_0})\rangle, \langle f(a_{i_0+1})\rangle, \ldots, \langle f(a_{i_1})\rangle) \leftarrow \text{BatchRead}(\langle M\rangle;$$
$$\langle a\rangle; i_0, i_0+1, \ldots, i_1),$$

$$(\langle f(b_{i_0})\rangle, \langle f(b_{i_0+1})\rangle, \ldots, \langle f(b_{i_1})\rangle) \leftarrow \text{BatchRead}(\langle M\rangle;$$
$$\langle b\rangle; -i_0, -(i_0+1), \ldots, -i_1),$$

$$(\langle f(c_{i_0})\rangle, \langle f(c_{i_0+1})\rangle, \ldots, \langle f(c_{i_1})\rangle) \leftarrow \text{BatchRead}(\langle M\rangle;$$
$$\langle c\rangle; -i_0, -(i_0+1), \ldots, -i_1),$$

$$(\langle f(d_{i_0})\rangle, \langle f(d_{i_0+1})\rangle, \ldots, \langle f(d_{i_1})\rangle) \leftarrow \text{BatchRead}(\langle M\rangle;$$
$$\langle d\rangle; i_0, i_0+1, \ldots, i_1);$$

and outputting the function value secure text ($\langle f(a_i)\rangle$, $\langle f(b_i)\rangle$, $\langle f(c_i)\rangle$, $\langle f(d_i)\rangle$.

* * * * *